No. 816,451. PATENTED MAR. 27, 1906.
F. A. FORWOOD.
IMPLEMENT FOR TRUING THE INTERNAL FORMS OF TUBES.
APPLICATION FILED DEC. 30, 1903.
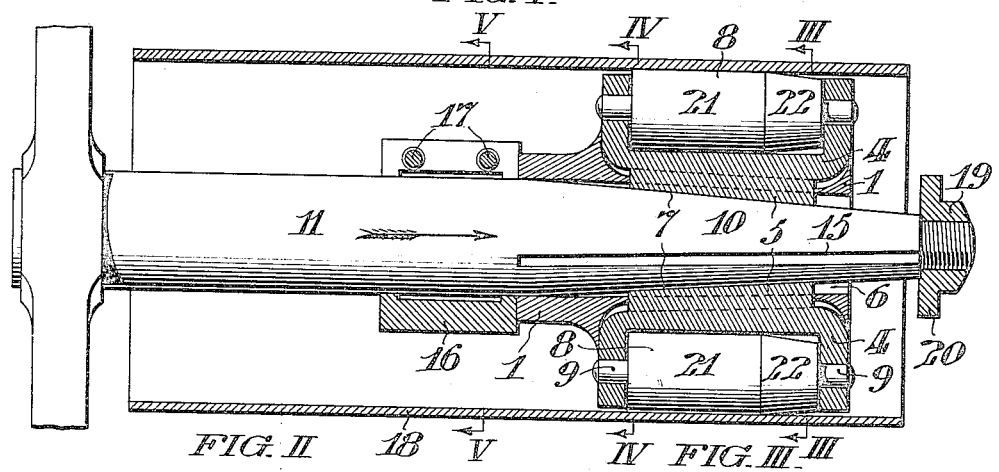
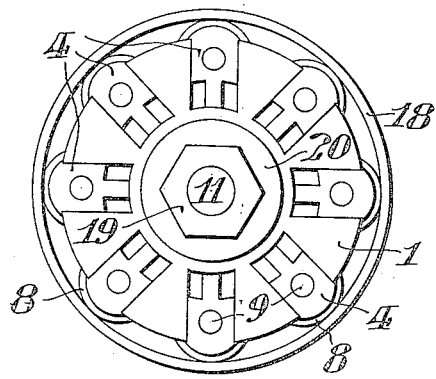
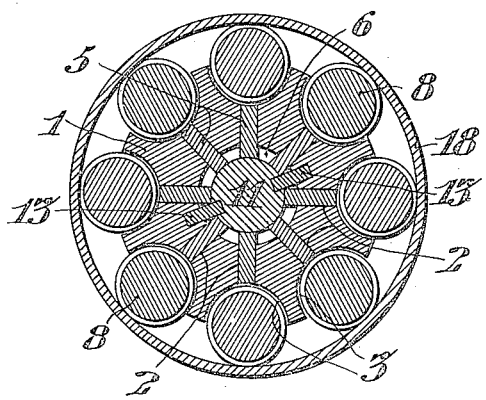
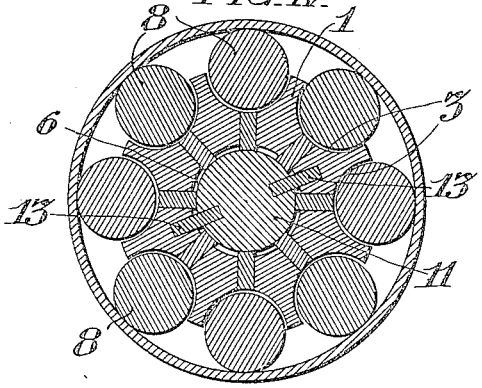
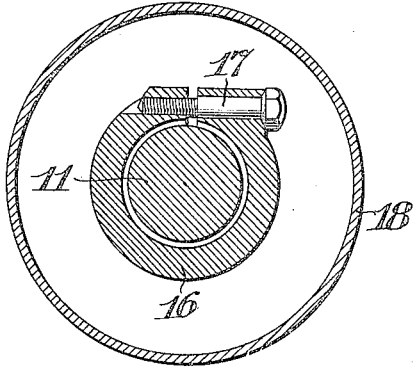
WITNESSES:
Clifton C. Hallowell
John C. Bergner
INVENTOR:
FRANCIS A. FORWOOD,
by his Attorneys
Paige Paul & Freely

UNITED STATES PATENT OFFICE.

FRANCIS A. FORWOOD, OF CHESTER, PENNSYLVANIA.

IMPLEMENT FOR TRUING THE INTERNAL FORMS OF TUBES.

No. 816,451.　　　　Specification of Letters Patent.　　　Patented March 27, 1906.

Application filed December 30, 1903. Serial No. 187,126.

*To all whom it may concern:*

Be it known that I, FRANCIS A. FORWOOD, of Chester, in the county of Delaware and State of Pennsylvania, have invented certain new and useful Improvements in Implements for Truing the Internal Forms of Tubes, whereof the following is a specification, reference being had to the accompanying drawings.

My invention relates to devices arranged to remove any defects, such as unevenness or indentations, in a cylindriform tube.

It is the object of my invention to provide an implement that may be passed into and, if necessary, through a tube, which may be rotated relatively therewith and provided with diametrically-expansible members arranged to press out any indentations or blisters which may occur upon its internal surface.

My invention further includes means arranged to prevent the expansible members from extending beyond the normal internal diameter of the tube being operated upon, thereby insuring that said tube may not be unduly expanded.

My invention comprises a series of rollers journaled in bearings which are carried by a radially-slotted body and arranged to be diametrically expanded relatively therewith by a tapered bar thrust in axial direction within said body and arranged to engage and wedge said bearing outwardly and a collar capable of entering the tube adjustably mounted on said bar and arranged to limit the extent of movement to which said bearings are subjected.

My invention includes the various novel features of construction and arrangement hereinafter more definitely specified.

In the accompanying drawings, Figure I is a central longitudinal section of a convenient form of my invention and the tube being operated upon. Fig. II is an end elevation as seen from right of Fig. I. Fig. III is a transverse vertical section taken on the line III III in Fig. I. Fig. IV is a transverse vertical section taken on the line IV IV in Fig. I. Fig. V is a transverse vertical section taken on the line V V in Fig. I.

In said figures, 1 is a radially-slotted supporting-body whose slots 2 terminate in equally-spaced semicylindriform sockets 3 in its periphery, arranged to receive the diametrically-expansible bearings 4, whose inner extensions 5 are arranged to slide radially in the slots 2 and extend into the central aperture 6 within the body 1. Each of the bearings 4 comprises a roller 8, whose trunnions 9 are journaled therein, as best shown in Fig. I. The inner extensions 5 of said bearings 4 have their inner faces 7 inclined to conform with the tapered portion 10 of the bar 11, which is arranged to extend through the aperture 6 of the body 1 and be thrust in an axial direction to shift all of said bearings outwardly and to maintain the axes of their rollers in parallel and equidistant relation to the central axis. Said body 1 is provided with splines or keys 13, arranged to project in respective corresponding keyways 15 in the bar 11, so as to permit the free longitudinal movement of said bar within the body 1, but prevent relative rotary movement. The bar 11 is provided with a split collar 16, which is adjustably secured thereon by means of the bolts 17 and arranged to limit the movement of the bar 11 into the body 1, and thereby determine the extent of diametrical expansion of the bearings 4 and their rollers 8, which are arranged to engage and roll upon the interior surface of the tube 18. The end of the bar 11 is provided with a nut 19, having a flange 20, which forms a shoulder by which the body 1 is withdrawn when said bar 11 is retracted to release the bearings 4. Said rollers 8 each have a cylindrical periphery 21 throughout the greater portion of their length, but terminate in a conical periphery 22 at their forward ends, so that they may readily enter the tube 18 and may gradually press out the blisters or indentations encountered by being thrust in an axial direction while the tube is rotated therearound.

It may be observed that the device herein shown and described is of such dimensions as to be capable of being inserted within and passed through the tube to be operated upon. It is therefore capable of correcting defects which may occur remote from the ends of said tube.

The implement may be inserted in a section of tube having the desired internal diameter and the bar thrust into the body 1 until its tapered periphery presses the bearings 4 outward sufficiently to engage the rollers 8 firmly against the interior of the tube. The collar 16 is then set upon the bar 11 against the body 1, as shown in Fig. I, and further expansion of the bearings 4 is thereby prevented. Said implement is then inserted in the tube to be trued, which may be rotated by any suitable means, while the implement is thrust therethrough in the direction indicated by the arrow in Fig. I with its rollers rotating upon the inner surface of said tube to roll out any defects therein encountered, which are first gradually pressed out by the conical surfaces 22, followed by the cylindrical surfaces 21 to produce a smooth cylindric internal surface in the tube.

When it is desired to withdraw the implement, the bar 11 is shifted rearwardly until the flange 20 engages the forward end of the body 1, in which position the rollers 8 are contracted to their innermost extent and may then be readily withdrawn.

I claim—

1. In an implement for truing the internal forms of tubes, the combination of a radially-slotted body containing within its slots diametrically-expansible bearings each carrying a roller, said body with its bearings and rollers being adapted to be indefinitely progressed through a tube which is to be trued; a bar carrying said body, slidably fitted therein, and having a tapering portion adapted to expand said bearings when thrust forward within the radially-slotted body; means for preventing rotation of said slotted body upon said bar; and an adjustable collar upon said bar of a size small enough to pass through the tube to be trued by which the extent to which the bar may be thrust into the body is limited, substantially as set forth.

2. In an implement for truing the internal forms of tubes, the combination of a radially-slotted body containing within its slots diametrically-expansible bearings each carrying a roller with a cylindrical and a tapering face, said body with its bearings and rollers being adapted to be indefinitely progressed through a tube which is to be trued; a bar carrying said body, slidably fitted therein, and having a tapering portion adapted to expand said bearings when thrust forward within the radially-slotted body; means for preventing rotation of said slotted body upon said bar; and an adjustable collar upon said bar of a size small enough to pass through the tube to be trued by which the extent to which the bar may be thrust into the body is limited, substantially as set forth.

3. In an implement for truing the internal form of tubes, the combination of a radially-slotted body containing within its slots diametrically-expansible bearings, each carrying a roller, the said body with its bearings and rollers being free to be indefinitely progressed through a tube which is to be trued; a bar by which said body is carried, slidably fitted therein, and having a tapering portion adapted to expand said bearings; means for preventing rotation of said slotted body upon said bar; and shoulders upon the bar which limit the motion of the body upon it in either direction, and both of which are small enough to pass freely within the tube to be trued, between which shoulders the body is free to slide longitudinally upon the bar, substantially as set forth.

FRANCIS A. FORWOOD.

Witnesses:
IRA STOVER MYERS,
S. LLOYD WIEGAND.